United States Patent [19]

Ogawa

[11] Patent Number: 4,530,709
[45] Date of Patent: Jul. 23, 1985

[54] METHOD FOR PRODUCING OPTICAL FIBER

[75] Inventor: Kazufumi Ogawa, Hirakata, Japan

[73] Assignee: Matsushita Electric Industrial Co., Ltd., Osaka, Japan

[21] Appl. No.: 550,548

[22] Filed: Nov. 10, 1983

[30] Foreign Application Priority Data

Nov. 16, 1982 [JP] Japan .................................. 57-201461
Mar. 14, 1983 [JP] Japan .................................. 58-41759
Mar. 14, 1983 [JP] Japan .................................. 58-41760

[51] Int. Cl.³ .................................................. C03B 25/02
[52] U.S. Cl. ............................................ 65/3.12; 65/2; 65/18.2; 427/163
[58] Field of Search ............ 65/2, 3.11, 3.12, 18.2; 427/163

[56] References Cited

U.S. PATENT DOCUMENTS 4,135,901 1/1979 Fujiwara .............................. 65/3.12

FOREIGN PATENT DOCUMENTS 0046315 4/1978 Japan ................................... 65/3.12

OTHER PUBLICATIONS

"Preparation of Silica Glass Using a $CO_2$ Laser," Kobayashi et al., Applied Optics, vol. 14, No. 12, pp. 2817, 2818, 12/1975.

Primary Examiner—Robert Lindsay
Attorney, Agent, or Firm—Spencer & Frank

[57] ABSTRACT

A method for producing an optical fiber, more particularly a process for producing a preform in the course of the production of the optical fiber, which comprises the steps of using converging light beams as a heating source, heating the end of a starting rod with such light beams and blowing the fiber material-producing gases to the heated portion of the starting rod to grow the preform. The invention also provides a process for producing a low-loss optical fiber wherein the attenuation of light is greatly improved by growing the preform under reduced pressure or by applying supersonic waves to the heated end of the starting rod. There is also provided a process for producing a grated index optical fiber wherein the preform is produced by providing a specific distribution character to the converging light beams and to the impurity concentration of the blown gas so that the impurity concentration distribution will differ along the direction perpendicular to the preform growing direction.

13 Claims, 7 Drawing Figures (a)

(b)

(c)

METHOD FOR PRODUCING OPTICAL FIBER

BACKGROUND OF THE INVENTION

This invention relates to a method for producing an optical fiber used for optical communications and other purposes. More particularly, the invention provides a method for producing a low-loss glass-based optical fiber which method includes a high-purity preform forming process. It is also envisaged in this invention to provide a method for producing a low-loss glass-based graded index optical fiber incorporating a high-purity preform forming process.

The following nomenclature is used throughout the drawings:
1 . . . starting rod, 2 . . . oxyhydrogen burner, 3 . . . porous base material, 4 . . . carbon heater, 5, 12 . . . preform for core, 6 . . . gas inlet, 7 . . . converging light beams (laser beams), 8, 10 . . . laser, 9, 11 . . . gas nozzle, 13 . . . preform for clad, 14 . . . chamber where the core portion is deposited, 15 . . . chamber where the clad is deposited, 16 . . . exhaust port, 17 . . . vacuum pump.

The following methods are known for producing a glass-based optical fiber: (1) double crucible method, (2) MCVD (modified chemical vapor deposition) method and (3) VAD (vapor-phase axial deposition) method. The present invention is an improvement of the VAD method.

Figure 1A:
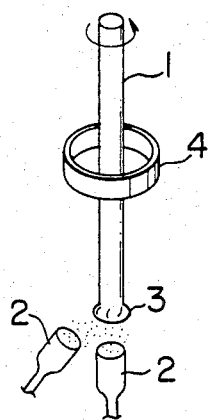
FIGS. 1(a) and (b) are schematic drawings illustrating the conventional VAD method.
Figure 1B:
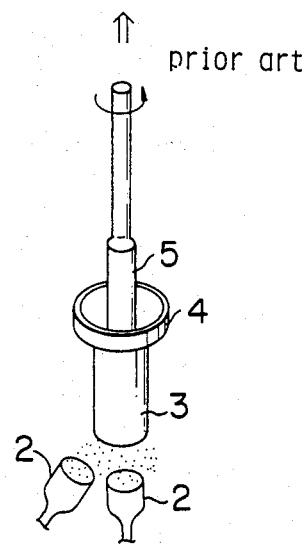

In the VAD method, as illustrated in FIG. 1 (a) and (b), the end of a glass rod called a starting rod 1 is heated by oxyhydrogen ($O_2+H_2$) burners 2 to precipitate such substances as $SiO_2$ and $GeO_2$ through the flame hydrolysis (FIG. 1(a)), and the rod is raised up as the deposition of the porous matrix material progresses. The porous deposit is melted by an upwardly positioned carbon heater 4 as shown in FIG. 1(b) to thereby produce a transparent matrix (preform) 5. During this operation, the materials such as $SiCl_4$ and $GeCl_4$ which form $SiO_2$ and $GeO_2$ are carried entrained by oxyhydrogen ($O_2+H_2$) which acts as a carrier gas.

However, according to this VAD method using the oxyhydrogen burners, water ($H_2O$) produced after the combustion is reacted with $SiCl_4$, etc., to cause a hydrolysis of such materials and the resulting reaction product remains as an OH group in the preform. The OH group left in the preform takes the form of —Si—OH and is stably fixed in the glass at normal temperature, causing the higher harmonics in the OH vibration absorption spectrum to come out in the spectral range useful for the practical use of the fiber. The presence of such OH group in the preform is especially harmful in case of using the wavelength of light from a GaAs or GaAlAs light source which is popularly used for optical communications.

As a means for eliminating such harmful spectral effect, use of heavy hydrogen ($D_2$), which is an isotope of hydrogen, in place of hydrogen used for the oxyhydrogen burners has been suggested, but this method is rather impractical because heavy hydrogen is very expensive.

Techniques for the dehydration treatment of the matrix material in a porous state have been also developed, but with the presently available techniques, the removal of residual OH group in the preform can be attained only to the level of 1 ppb at best.

On the other hand, in the CVD method such as the conventional MCVD method or VAD method, the unreacted gas left in the preform or the gas produced by the reaction would be entrapped in the preform to form fine cells therein when the preform is melted, such fine cells proving detrimental to the light transmittance, so that degassing must be performed in a final step. Further, it is impossible with such VAD method to produce a graded index optical fiber. According to this method, in the step of forming the preform for the core, the reaction gas is blown to the end of the starting rod to precipitate and deposit the fiber materials, so that the distribution of the impurities is made extremely uniform in the direction perpendicular to the fiber material depositing direction. This method is therefore inapplicable to the production of a graded index optical fiber whose refractive index is required to vary in the direction perpendicular to the fiber length.

SUMMARY OF THE INVENTION

In view of these disadvantages of the conventional VAD method as reviewed above, the present invention has for its object to provide a method for producing a low-loss optical fiber, said method comprising an improved process for forming a preform free of the OH group.

It is also an object of this invention to provide a method for producing a high-purity, low-loss optical fiber, said method including a process for forming a preform free of fine cells.

It is another object of this invention to provide a method for producing a graded index optical fiber, which method features a process for forming a preform containing neither an OH group nor fine cells.

STRUCTURE OF THE INVENTION

This invention provides a method for producing an optical fiber characterized by a novel process for forming a transparent vitreous preform in which the light beams converged to produce heat energy (for example, laser beams) are applied to the end of a starting rod and/or to the end of the growing preform to locally induce a reaction of $SiCl_4$ or $SiCl_4+GeCl_4$ with $O_2$ and the rod is raised up in accordance with the progress of deposition of $SiO_2$ or the mixture of $SiO_2$ and $GeO_2$ to thereby form said vitreous preform.

The present invention further comprises a means for eliminating the unreacted gases of $SiCl_4$, $GeCl_4$, $O_2$, etc., or preventing entrapment or incorporation of such unreacted gases into the preform by conducting the reaction by controlling the pressure in the reaction chamber at the level of several ten mmHg and a means for purging out the entrapped gases by the cavitation effect of the supersonic waves applied to the starting rod.

In this invention, the converged light beams are applied to the end of said starting rod so that a temperature difference will be produced in the direction perpendicular to the depositing direction of the fiber materials. Further, the gas nozzles are provided for introducing the fiber material-producing gases to precipitate and deposit the fiber materials such that the impurity concentration in the preform will differ (so as to segregate) in the direction perpendicular to the fiber material depositing direction.

DETAILED DESCRIPTION OF THE INVENTION

The present invention will be further described below by way of the embodiments thereof with reference to FIGS. 2, 3 and 4 of the accompanying drawings.

EXAMPLE 1

Figure 2:
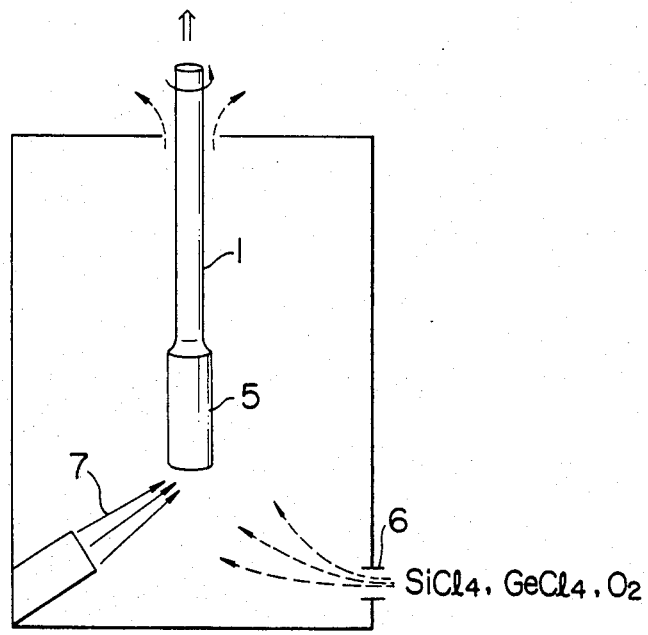
FIG. 2 is a diagrammatic illustration of the process for producing a core preform according to Example 1 of this invention.

First, the fundamental principle of this invention is explained by referring to FIG. 2.

In case of producing, for example, an ETLOF type optical fiber, a starting rod 1 made of, for instance, quartz glass is set in a closed vessel and, while introducing thereinto a mixed gas of $SiCl_4$ and $O_2$ as an atmospheric gas from a gas inlet 6, the carbon dioxide laser beams 7 are focussed at the end of the starting rod 1 to heat it, causing $SiO_2$ to precipitate at the heated portion alone. The starting rod 1 is raised up while turning it in accordance with the progress of precipitation and deposition of said material.

The chemical reaction that takes place in this operation is expressed by the following formula:

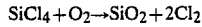

$$SiCl_4 + O_2 \rightarrow SiO_2 + 2Cl_2$$

Since $H_2$ is not used, the produced preform is free of an OH group and thus it is possible to obtain a pure quartz glass preform of the fiber core.

It is further possible to produce a transparent preform at one time by properly controlling the laser output, the starting rod turning speed and the gas feed.

A carbon dioxide laser is used in this invention because it allows effective local heating of the end portion alone of the preform where the deposition takes place, owing to high light absorptivity of quartz glass since the wavelength of the carbon dioxide laser beams is 10.6 μm. It is also ideal for inducing the reaction of $SiCl_4$ and $O_2$ at the heated end of the preform and for melting the deposit of $SiO_2$.

Then the thus formed preform, which is kept turning, is again heated sidewise thereof by said laser beams while blowing thereon, in this case, a mixed gas $SiCl_4$, $BCl_3$ and $O_2$, the former two being the clad-forming materials. In this way, there can be easily produced a preform for an optical fiber with the clad preform grown on the surface of the core preform.

In this invention, it is possible to form the clad preform by using other methods than the above-described one using the converged light beams, while forming the core preform by the above-described method. Also, the core preform may be made by using other methods while forming the clad preform by the above-described method.

EXAMPLE 2

Figure 3:
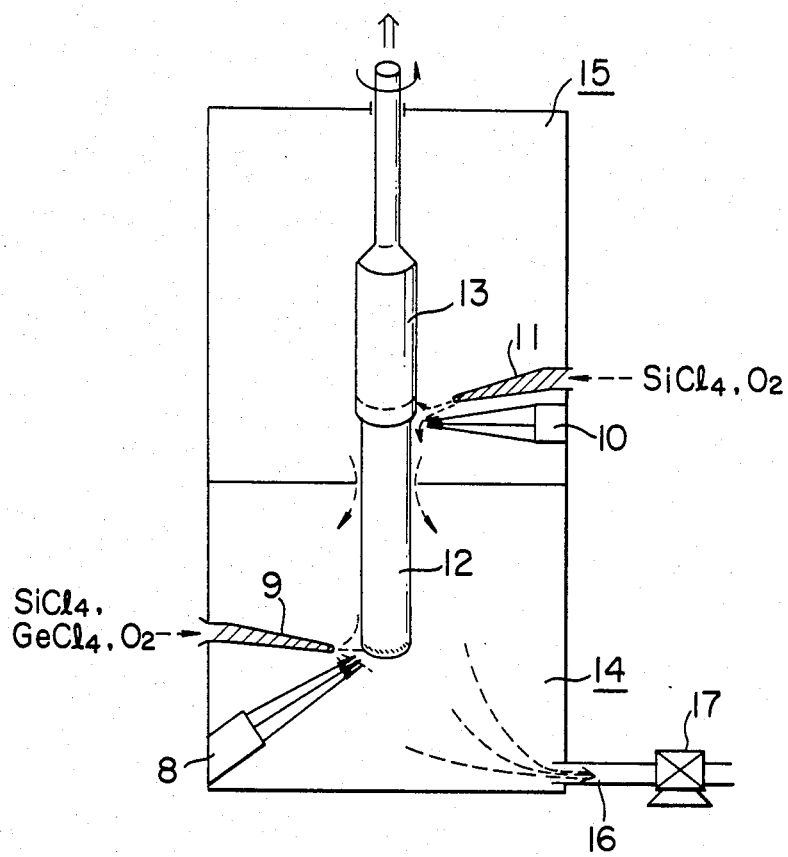
FIG. 3 is a schematic drawing illustrating the method for producing an optical fiber according to Example 2 and Example 3 of this invention.
Figure 4:
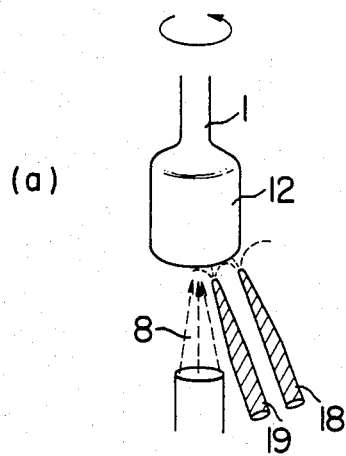
FIGS. 4(a), (b) and (c) are schematic drawings and diagrams illustrating the method for producing an optical fiber according to Example 4 of this invention.
Figure 4:
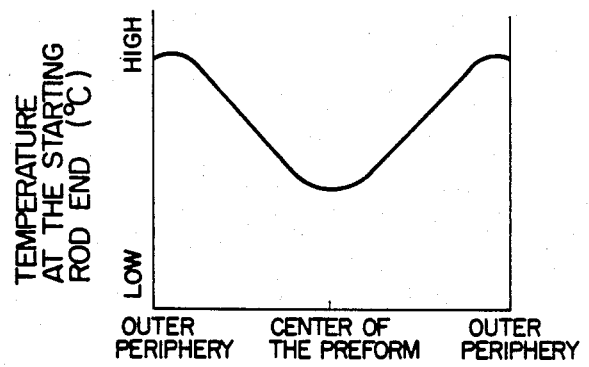
Figure 4:
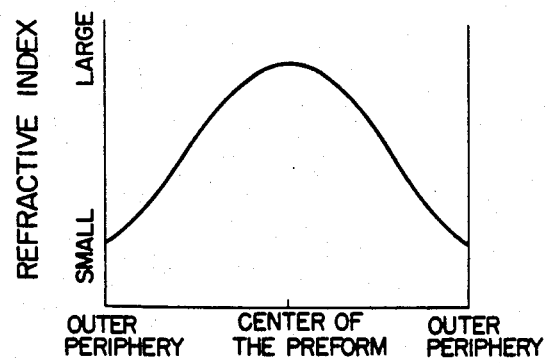

A method for producing both the core portion and the clad portion of an optical fiber at one time is described herein by referring to FIG. 3. in case of producing, for instance, a CORNING type optical fiber, first a high silicate glass 12 (composed mainly of $SiO_2$ and containing $GeO_2$), from which the core is to be formed, is deposited and grown up from the end of the starting rod by using a carbon dioxide laser 8 for depositing the core materials, a gas nozzle 9 for supplying a mixed gas of $SiCl_4$, $GeCl_4$ and $O_2$, a carbon dioxide laser 10 for depositing the clad materials and a gas nozzle 11 for supplying $SiCl_4$ and $O_2$.

When the core-forming high silicate glass rod 12 has been formed to a certain thickness, the carbon dioxide laser beams are applied sidewise to said high silicate glass rod 12 to cause deposition of quartz glass 13 which is to form the clad preform, that is, the clad of the optical fiber, on the surface of the rod 12.

The vessel is sectioned by a partition wall into a chamber 14 where the core portion is deposited and a chamber 15 where the clad portion is deposited, and an exhaust port 16 is provided in the chamber 14 for discharging out the reaction gases, thereby preventing $GeCl_4$ and other Ge impurities from entering the clad forming chamber 15.

In case of producing an ETLOF type optical fiber, the exhaust port is provided in the clad forming chamber 15, and a mixed gas of $SiCl_4$ and $O_2$ is supplied from the gas nozzle 9 in the core forming chamber 14 and a mixed gas of $SiCl_4$, $BCl_3$ and $O_2$ is supplied from the gas nozzle 11 in the clad forming chamber.

Thus, by gradually raising up the starting rod while turning it in accordance with the progress of deposition, it is possible to continuously produce a preform for an optical fiber. By finally subjecting the preform to a line drawing machine, a long-distance optical fiber can be obtained.

The lasers 8, 10 may be provided in the chambers 14, 15 as in the shown embodiment, or the laser beams may be introduced into the respective chambers 14, 15 from the outside thereof. If the chambers 14, 15 are formed by quartz, the laser beams may be absorbed in this section, so that the laser beam introducing portions of the chambers 14, 15 are preferably constructed with a light transmitting material such as silicon.

Thus, a glass-based low-loss optical fiber can be easily produced according to the first and second embodiments of the invention described above. That is, it is possible to produce a high-precision low-loss optical fiber in which no absorption of light is caused by the vibrations of an —OH group because no —OH group is contained in the preform.

It is further possible to perform local heating of only those parts where the core or cladding material is deposited, assuring an extremely high energy efficiency. Also, since the high-purity material gases alone contact the area of deposition, there is no possibility of mixing with other impurity substances. Still further, since continuous production is possible as in the conventional VAD method, it is possible to produce a seamless long-distance optical fiber.

EXAMPLE 3

In case of producing a CORNING type optical fiber, as illustrated in FIG. 3, a high silicate glass 12 (composed mainly of $SiO_2$, containing $GeO_2$) is precipitated and grown up from the end of a starting rod 1 by using a carbon dioxide laser 8 for effecting the deposition of the core portion, a gas nozzle 9 for supplying a mixed gas of $SiCl_2$, $GeCl_4$ and $O_2$, another carbon dioxide laser 10 for effecting the deposition of the clad portion and a gas nozzle 11 for supplying a mixed gas of $SiCl_4$ and $O_2$, under a reduced pressure condition such that, for example, the total pressure of $SiCl_4$, $GeCl_4$ and $O_2$ will be 50 mmHg.

When the high silicate glass rod 12, which becomes the core of the optical fiber, has been formed to a certain volume, the carbon dioxide laser beams are applied sidewise to this glass rod 12, causing precipitation and deposition of the cladding quartz glass 13 on the surface of said rod 12.

In this method, the chamber 14 where the core portion is deposited and the chamber 15 where the clad is deposited are separated by a partition wall, and an exhaust port 16 is provided in the chamber 14 to discharge out the reaction gases by a vacuum pump 17 so that the gas pressure in the chamber 15 will remain constant. This arrangement eliminates any chance of the gases flowing back into the chamber 15 from the chamber 14 and can also prevent $GeCl_4$ and other Ge impurities from entering the clad forming chamber 15. It is further possible to reduce the cells in the preform by keeping both chambers 14, 15 under a reduced pressure condition. In this case, however, the growing rate of the deposition is lowered, so that it is necessary to adjust the gas pressure in conformity to the performance of the optical fiber to be produced.

In case of producing an ETLOF type optical fiber, the exhaust port is provided in the clad forming chamber 15 and a mixed gas of $SiCl_4$ and $O_2$ is supplied from the gas nozzle 9 in the core forming chamber 14 while a mixed gas of $SiCl_4$, $BCl_3$ and $O_2$ is supplied from the gas nozzle 11 in the clad forming chamber.

When the starting rod is raised up while turning it in accordance with the progress of said deposition process, there can be continuously produced an optical fiber preform having few cells therein.

When elevating the starting rod end heating temperature to a degree sufficient to cause melting of the optical fiber materials, supersonic waves may be further applied to the starting rod to purge out the gases remaining in the molten deposit of the optical fiber materials by the cavitation effect of the supersonic waves.

A long-distance optical fiber can be produced by finally working this preform with a line drawing machine.

The lasers 8, 10 may be provided in the chambers 14, 15, or the laser beams may be introduced into the respective chambers 14, 15 from the outside thereof. If the chambers 14, 15 are made of quartz, the laser beams may be absorbed in this section, so that the laser beam introducing portions of the respective chambers 14, 15 are preferably constructed with a light transmitting material such as silicon.

According to this third embodiment, it is possible to easily produce a glass-based high-purity and low-loss optical fiber which is free of cells with no need of any degassing operation. That is, since the fiber preform obtained according to this embodiment contains no —OH group, a high-precision low-loss optical fiber having no possibility of light absorption by the —OH group vibrations can be produced. Further, entrapment of the reaction gases or unreacted gases in the preform can be minimized. Also, heating can be conducted locally at those portions alone where the core or clad materials are deposited, so that such heating can be accomplished at an extremely high energy efficiency. Moreover, since the high-purity working gases alone contact the deposition area, there is no chance for the other impurity substances to mix therein. Still further, since continuous production is possible as in the conventional VAD method, it is possible to obtain a seamless long-distance optical fiber.

EXAMPLE 4

For producing a graded index optical fiber, as illustrated in FIG. 4(a), the converging light beams 8 are applied to the central part alone of the end of the starting rod 1 so that it will have a temperature distribution such as shown in FIG. 4(b) in the direction perpendicular to the depositing direction (preform growing direction) of the optical fiber material, and further a mixed gas (for example, $SiCl_4 + O_2$) is blown to the central part while another mixed gas ($SiCl_4 + BCl_3 + O_2$) is blown to the outer periphery from the respective gas nozzles 19 and 18 to deposit the optical fiber materials. It is thereby possible to easily produce a focussing optical fiber preform 12 in which the impurity concentration differs from the central part to the outer peripheral part of the preform, that is, the refractive index is greater at the central part of the preform than at its outer peripheral part.

Thus, according to this fourth embodiment, a glass-based high-purity and low-loss graded index optical fiber can be easily produced. Such optical fiber has no possibility of light absorption by the —OH group vibrations because no —OH group is contained in the preform.

Further, heating can be accomplished locally at the part alone where the optical fiber materials are deposited, so that the energy efficiency for such heating is extremely high. Also, since the high-purity working gases alone contact the area of deposition, there is no possibility of contamination by the impurities. Moreover, since continuous production is possible as in the conventional VAD method, a seamless long-distance optical fiber can be produced.

It will be obvious that if the operations are carried out in a reduced pressure gas atmosphere or by applying the supersonic energy to the end of the starting rod as in the case of the third embodiment, the same effect can be obtained.

EFFECT OF THE INVENTION

According to this invention, as described above, it is possible to produce a preform free of an —OH group and to provide a low-loss optical fiber.

What I claim is:

1. A process for producing an optical fiber, comprising the steps of:
   heating the bottom end of a substantially vertically oriented glass rod in a gas atmosphere with converging light beams wherein said gas atmosphere consists of a gaseous substance for forming a component vitreous material which is completely free of hydrogen gas, said material being thereby precipitated and deposited on the end of said glass rod;
   moving said glass rod upward at a speed determined by the rate of deposition of said material to form a preform of the core of said optical fiber; and
   heating the side of said core preform in a gas atmosphere with converging light beams to form a clad preform on the surface of said core preform.

2. A process for producing an optical fiber, comprising the steps of:

heating the bottom end of a substantially vertically oriented glass starting rod with converging light beams while simultaneously turning said rod;

blowing a mixed gas onto the heated portion of said rod wherein said mixed gas consists of gaseous substances for forming a component vitreous material which is completely free of hydrogen gas, said material being thereby precipitated and deposited on said portion of said glass rod;

further heating said deposited material with said converging light beams; and blowing thereon a mixed gas for forming the clad materials of said optical fiber to precipitate and deposit said clad materials on said portion thereby producing a preform of said optical fiber.

3. The process for producing an optical fiber according to claim 1 wherein the gas atmosphere is under a reduced pressure.

4. The process for producing an optical fiber according to claim 1 wherein the preform is produced by applying supersonic waves to said starting rod.

5. The process for producing an optical fiber according to claim 4 wherein the gas atmosphere is under a reduced pressure.

6. The process for producing an optical fiber according to claim 1 wherein said converging light beams are formed by carbon dioxide lasers.

7. A process for producing a graded index optical fiber comprising the steps of:

heating the bottom end of a substantially vertically oriented glass rod in a gas atmosphere with converging light beams wherein said gas atmosphere consists of a gaseous substances for forming a component vitreous material which is completely free of hydrogen gas, said material being thereby precipitated and deposited in a longitudinal direction along said glass rod, the light beams being applied to produce a temperature difference in the direction perpendicular to said longitudinal direction along which said material is deposited; and blowing onto said heat portion an impurity gas and said gaseous substance from respective gas nozzles to deposit optical fiber materials on said portion whereby the impurity concentration changes along said perpendicular direction thereby forming a preform of said graded index optical fiber.

8. The process for producing an optical fiber according to claim 7 wherein the gas atmosphere is under a reduced pressure.

9. The process for producing an optical fiber according to claim 7 wherein the preform is produced by applying supersonic waves to said starting rod.

10. The process for producing an optical fiber according to claim 2 wherein the gas atmosphere is under a reduced pressure.

11. The process for producing an optical fiber according to claim 2 wherein the preform is produced by applying supersonic waves to said starting rod.

12. The process for producing an optical fiber according to claim 11 wherein the gas atmosphere is a reduced pressure.

13. The process for producing an optical fiber according to claim 2 wherein said converging light beams are formed by carbon dioxide lasers.

* * * * *